(12) United States Patent
Tanaka (10) Patent No.: US 7,944,509 B2
(45) Date of Patent: May 17, 2011

(54) VIDEO PROCESSING APPARATUS, VIDEO PROCESSING METHOD AND PROGRAM FOR ASYNCHRONOUS INPUT AND OUTPUT VIDEO IMAGES

(75) Inventor: Shingo Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1299 days.

(21) Appl. No.: 11/509,803

(22) Filed: Aug. 25, 2006

(65) Prior Publication Data
US 2007/0046679 A1 Mar. 1, 2007

(30) Foreign Application Priority Data

Aug. 25, 2005 (JP) ................................. 2005-244391

(51) Int. Cl.
*H04N 9/64* (2006.01)
*H04N 7/10* (2006.01)

(52) U.S. Cl. ...................... 348/718; 348/714; 348/14.08; 345/535

(58) Field of Classification Search ........ 348/14.08–14.1, 348/143, 153, 159, 588, 714, 716, 718, 719; 345/532, 534, 535, 543, 544, 574
See application file for complete search history.

(56) References Cited

U.S. PATENT DOCUMENTS

| | | | |
|---|---|---|---|
| 4,797,746 A | | 1/1989 | Ashcraft |
| 5,428,399 A | * | 6/1995 | Robinson et al. ............ 348/459 |
| 5,446,496 A | * | 8/1995 | Foster et al. ................. 348/441 |
| 6,054,980 A | * | 4/2000 | Eglit ............................ 345/204 |
| 6,456,335 B1 | | 9/2002 | Miura et al. .................. 348/588 |
| 6,515,672 B1 | * | 2/2003 | Sheaffer et al. .............. 345/534 |
| 6,559,896 B1 | * | 5/2003 | Zwartenkot et al. ......... 348/714 |
| 7,310,120 B2 | * | 12/2007 | Zalewski ...................... 348/715 |
| 7,336,317 B2 | * | 2/2008 | Yui et al. ...................... 348/459 |
| 2006/0170762 A1 | | 8/2006 | Tanaka et al. ............. 348/14.09 |

FOREIGN PATENT DOCUMENTS

JP 64-046376 2/1989
(Continued)

OTHER PUBLICATIONS

Office Action in Japanese Application No. 2005-244391, dated Jan. 9, 2009 and English-language translation thereof.
(Continued)

*Primary Examiner* — Victor Kostak
(74) *Attorney, Agent, or Firm* — Nixon & Vanderhye, PC (57) ABSTRACT

There is provided with a video processing method including: writing first video signals representing an input video frame alternately into first and second storage regions every input video frame; reading out the written first video signals from either the first storage region or the second storage region; generating second video signals representing an output video frame including a video image represented by the first video signals read out; acquiring write region information indicating either the first storage region or the second storage region into which writing is being performed, before reading is performed; acquiring write location information indicating a location on the first or second storage region, associated with the first video signal which is being written, before reading is performed; and deciding either the first storage region or the second storage region from which reading should be performed, by using the write region information and the write location information.

10 Claims, 9 Drawing Sheets

FOREIGN PATENT DOCUMENTS

| | | |
|---|---|---|
| JP | 5-212913 | 8/1993 |
| JP | 9-270954 | 10/1997 |
| JP | 10-164566 | 6/1998 |
| JP | 11-88854 | 3/1999 |
| JP | 11-187372 | 7/1999 |
| JP | 11-234654 | 8/1999 |
| JP | 2001-285713 | 10/2001 |
| JP | 2003-046805 | 2/2003 |

OTHER PUBLICATIONS

Office Action in Japanese Application No. 2005-244391 dated Apr. 3, 2009 and English-language translation thereof.

Office Action issued on Sep. 5, 2008, in Chinese Patent Application No. 2006101256576 and English-language translation thereof.

Office Action in Japanese Application No. 2005-244391 dated Oct. 10, 2008 and English-language translation thereof.

\* cited by examiner

VIDEO PROCESSING APPARATUS, VIDEO PROCESSING METHOD AND PROGRAM FOR ASYNCHRONOUS INPUT AND OUTPUT VIDEO IMAGES

CROSS-REFERENCE TO RELATED APPLICATIONS

This application is based upon and claims the benefit of priority from the prior Japanese Patent Applications No. 2005-244391 filed on Aug. 25, 2005, the entire contents of which are incorporated herein by reference.

BACKGROUND OF THE INVENTION

1. Field of the Invention

The present invention relates to a real time video processing apparatus which receives a video signal transmitted at first timing, stores a part or the whole of the video signal in a storage medium, generates a video image on the basis of information read out from the storage medium, and outputs a video signal at second timing, and relates to such a video processing method and program.

2. Description of the Background

In the case of the so-called multipoint video conference in which communication is performed among a plurality of terminals by using microphone voices and camera video images, the load is heavy in the aspect of communication and terminal processing if simply the terminals are connected in a full mesh form. In general, therefore, a technique of providing an MCU (Multipoint Control Unit) is used. The MCU is a kind of a server, and has a function of connecting with terminals, receiving voice and video images from the terminals, composing them, and transmitting resultant composite video images and voices to the terminals. Owing to this MCU, it becomes possible for the terminals to obtain voices and video images from all participants by only communicating with the MCU and receiving a composite voice and a composite video image, resulting in a high efficiency in the aspect of communication and terminal processing. In this way, the MCU plays an important role in the multipoint video conference. Here, the real time video processing technique is utilized.

As another application of the real time video processing technique, there is a screen splitting unit in a surveillance camera. In general, surveillance cameras are installed in a building or the like. If separate monitors are used for respective surveillance cameras, the equipment becomes large-scaled, resulting in lowered convenience. In a typically used technique, therefore, a screen splitting unit is used, and a plurality of camera video images are composed to generate one video signal. The one video signal is ascertained using a single monitor or recorded using a single video recorder.

In this way, the video processing technique is already used in the fields of video conference and surveillance camera frequently. A large number of inventions concerning the video processing technique have been proposed. As for, for example, video conference, JP-As 9-270954(KOKAI), 10-164566(KOKAI), 11-187372(KOKAI) and 11-88854 (KOKAI) can be mentioned. As for the surveillance camera and the like, JP-As 10-164566(KOKAI) and 11-234654(KOKAI) can be mentioned.

In a general form of such a video processing technique, basically predetermined video processing is performed on input video images while using a frame buffer such as a RAM and an output video image is generated.

Figure 13A:
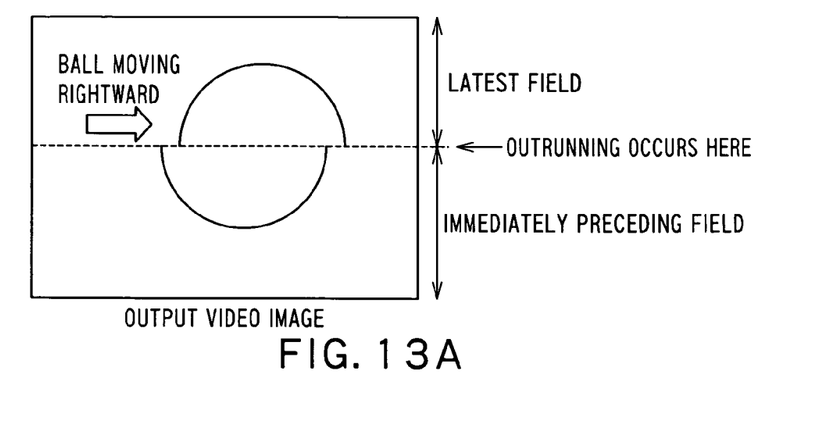
FIGS. 13A-13C are a diagram explaining problems of a related technique.

Video frames are successively written into a RAM, and the video frames are successively read out. If there is time to spare, no problems are caused by performing them alternately. When both writing and reading are performed successively without interruption in the real time processing as described above and the writing rate is different from the reading rate, there is a possibility that reading will be performed with writing unfinished unless any countermeasure is taken. For example, a portion in which new update has been reflected and an old portion in which new update has not been reflected are mixedly present in a video frame read out. In this case, an immediately preceding video frame is partially mixed into a video image read out, and the video image is ruined. FIG. 13A shows its situation.

In order to prevent access contention between the writing side and the reading side, a technique called double buffer processing is used in general. Finely, the double buffer processing has a plurality of meanings. Here, however, the double buffer processing means a method of preparing two frame buffers on the RAM and thereby preventing the above-described access contention. For example, when the writing side writes frames, the frames are written alternately into the two buffers. On the other hand, the reading side reads a frame from a buffer from which writing is not being performed. In other words, operation is performed so as to alternately interchange a buffer to write in and a buffer to read out. By doing so, the buffer to read out is always completed in writing. As a result, a perfect state is ensured and video images are prevented from being ruined.

Basically, in the conventional double buffer processing, a method of causing one of writing and reading to access two buffers alternately and causing the other of writing and reading to always access a buffer which is not being accessed as described above is typical. In this method, however, a problem occurs when frames in the input video image and the output video image are not synchronized. For example, it is supposed that frames in the input video image and the output video image are not synchronized in the video processing apparatus exemplified earlier.

Figure 13B:
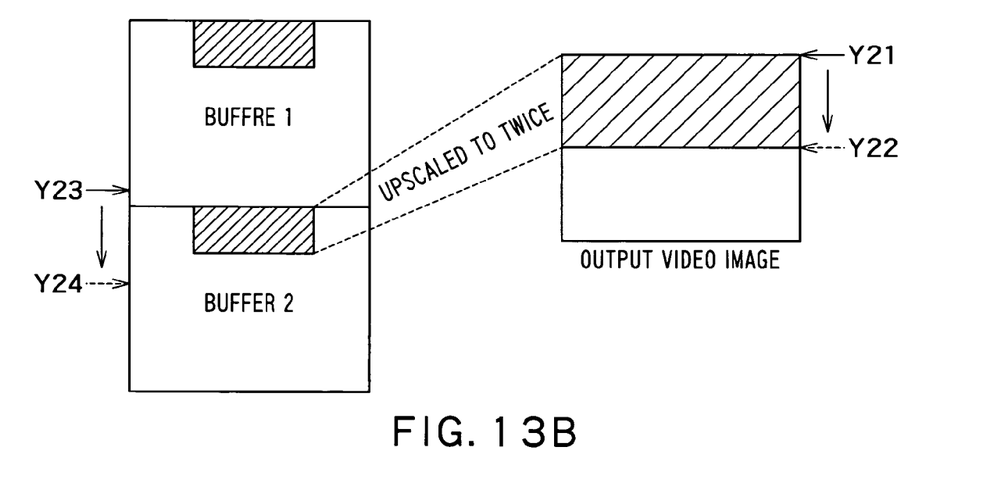

It is supposed that there is a video processing apparatus having a configuration in which an input video image is written into a RAM, read out, upscaled by a factor of two, and output. A double buffer is formed on the RAM as shown in a left-hand drawing in FIG. 13B. Writing is performed on the whole video frame. However, reading is performed only on a range of a shaded portion shown in the left-hand drawing in FIG. 13B. A portion obtained by upscaling the shaded portion to twice is disposed in an output video frame as shown in a right-hand drawing in FIG. 13B. When a reader is performing processing on a portion indicated by a solid line arrow Y21 shown in the right-hand drawing in FIG. 13B, a writer is performing processing on a portion indicated by a solid line arrow Y23 shown in the left-hand drawing in FIG. 13B. At this time, the solid line arrow Y23 of the writer side is in a buffer 1. In the conventional double buffer processing, therefore, the reader reads out from a buffer 2 as shown in FIG. 13B. If the processing on the output video image moves to a dotted line arrow Y22 in a right-hand drawing and reading from the buffer 2 is completed, then the writer proceeds by the same quantity and moves to a dotted line arrow Y24 in a left-hand drawing. This location has exceeded the lower end of a read region, and consequently it is meant that the writer side outruns the reader side on the way. Before the time when outrunning occurs, the video image read out becomes an immediately preceding frame as compared with that obtained after the time. Thus, video images in different frames are mixedly present, resulting in a ruined video image.

It is now supposed that an input video image is downscaled to ½, written into a frame buffer, read out, and output intact.

Figure 13C:
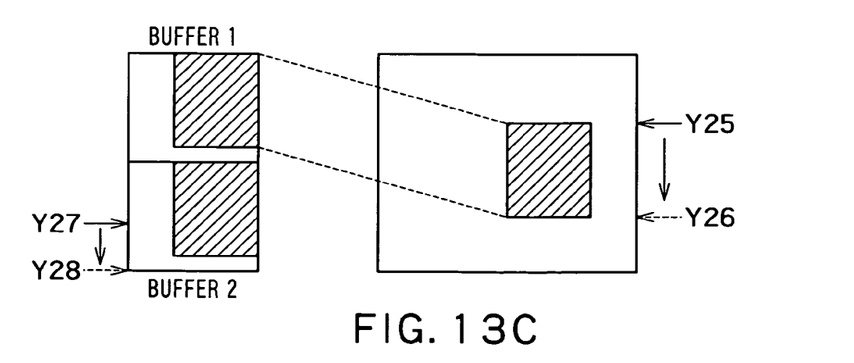

This time, the frame buffers are downscaled to ½ as shown in a left-hand drawing in FIG. 13C. Since writing is performed in synchronism with the input video image, the rate at which the write access moves downward is also reduced to ½. In the same way as the foregoing description, the reader reads only a shaded portion, and disposes it in an output video image. If the writer performs processing on a portion indicated by a solid line arrow Y27 shown in the left-hand drawing in FIG. 13C when the reader performs processing on a portion indicated by a solid line arrow Y25, then in the conventional method data is read out from the buffer 1 which is not being accessed by the writer as illustrated. When an arrow shown in a right-hand drawing in FIG. 13C has arrived at a terminating dotted line arrow Y26, however, the access location of the writer moves to a portion indicated by a dotted line arrow Y28 as shown in the left-hand drawing in FIG. 13C at a half rate, and a video image of a shaded portion in the buffer 2 has been completely updated. Eventually, therefore, a newer frame would be obtained without ruining if reading was performed from the buffer 2.

Thus, in the conventional method, access contention cannot be excluded completely when, for example, frame synchronization is not attained. In addition, the latest frame is not read out in some cases. Since a plurality of video images are input and output in, for example, a video composing apparatus, it becomes difficult to attain frame synchronization between them for various reasons in some cases. In addition, since bi-directional communication is demanded in video conference and the like, the real time property of video images becomes very important and it poses a problem that the latest frame is not read out.

As a related technique, JP-A 5-212913(KOKAI) can be mentioned. A technique of determining which buffer to access according to a certain decision method is proposed therein. However, this technique is different from the above-described problem in that it is specialized in printers.

SUMMARY OF THE INVENTION

According to an aspect of the present invention, there is provided with a video processing apparatus comprising: a video storage having first and second storage regions; a writer configured to write first video signals representing an input video frame alternately into the first and second storage regions every input video frame; a reader configured to read out the written first video signals from either the first storage region or the second storage region; a generator configured to generate second video signals representing an output video frame including a video image represented by the first video signals read out; a write region acquirer configured to acquire write region information indicating either the first storage region or the second storage region into which the writer is performing writing, before the reader performs reading; a write location acquirer configured to acquire write location information indicating a location on the first or second storage region, associated with the first video signal the writer is writing, before the reader performs reading; and a buffer decider configured to decide either the first storage region or the second storage region from which the reader should performs reading, by using the write region information and the write location information.

According to an aspect of the present invention, there is provided with a video processing apparatus comprising: a video storage having first and second storage regions; a writer configured to write first video signals representing an input video frame into either the first storage region or the second storage region; a reader configured to read out the written first video signals alternately from the first storage region and the second storage region every output video frame; a generator configured to generate second video signals representing an output video frame including a video image represented by the first video signals read out; a read source acquirer configured to acquire read source information indicating either the first storage region or the second storage region from which the reader is performing reading, before the writer performs writing; a read location acquirer configured to acquire read location information indicating a location on the first or second storage region, associated with the first video signal the reader is reading, before the writer performs writing; and a buffer decider configured to decide either the first storage region or the second storage region into which the writer should write, by using the read source information and the read location information.

According to an aspect of the present invention, there is provided with a program which is executed by a computer, comprising instructions for: writing first video signals representing an input video frame alternately into first and second storage regions every input video frame; reading out the written first video signals from either the first storage region or the second storage region; generating second video signals representing an output video frame including a video image represented by the first video signals read out; acquiring write region information indicating either the first storage region or the second storage region into which writing is being performed, before reading is performed; acquiring write location information indicating a location on the first or second storage region, associated with the first video signal which is being written, before reading is performed; and deciding either the first storage region or the second storage region from which reading should be performed, by using the write region information and the write location information.

According to an aspect of the present invention, there is provided with a video processing method comprising: writing first video signals representing an input video frame alternately into first and second storage regions every input video frame; reading out the written first video signals from either the first storage region or the second storage region; generating second video signals representing an output video frame including a video image represented by the first video signals read out; acquiring write region information indicating either the first storage region or the second storage region into which writing is being performed, before reading is performed; acquiring write location information indicating a location on the first or second storage region, associated with the first video signal which is being written, before reading is performed; and deciding either the first storage region or the second storage region from which reading should be performed, by using the write region information and the write location information.

DETAILED DESCRIPTION OF THE INVENTION

First Embodiment

Figure 1:
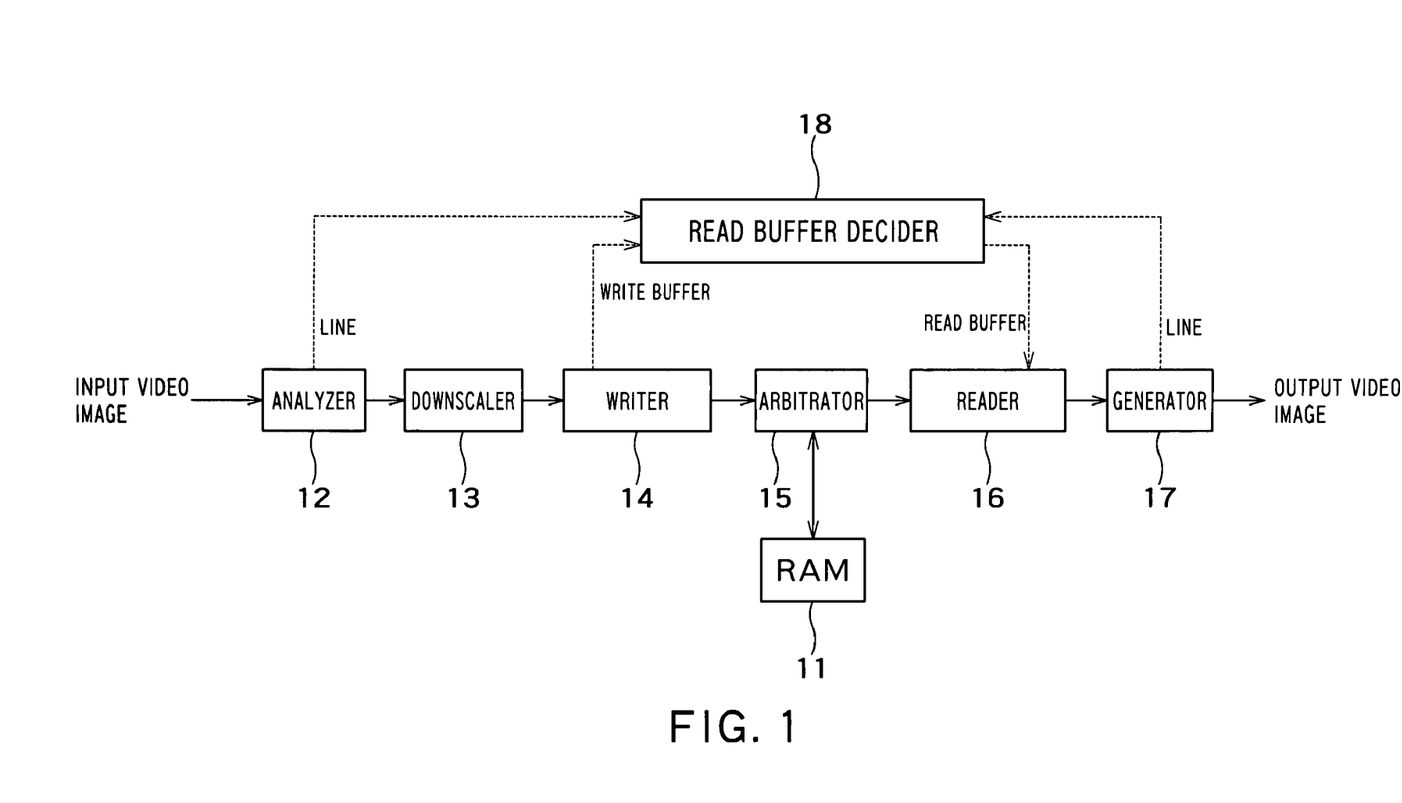
FIG. 1 is a diagram showing a configuration of a first embodiment of the present invention.
Figure 10:
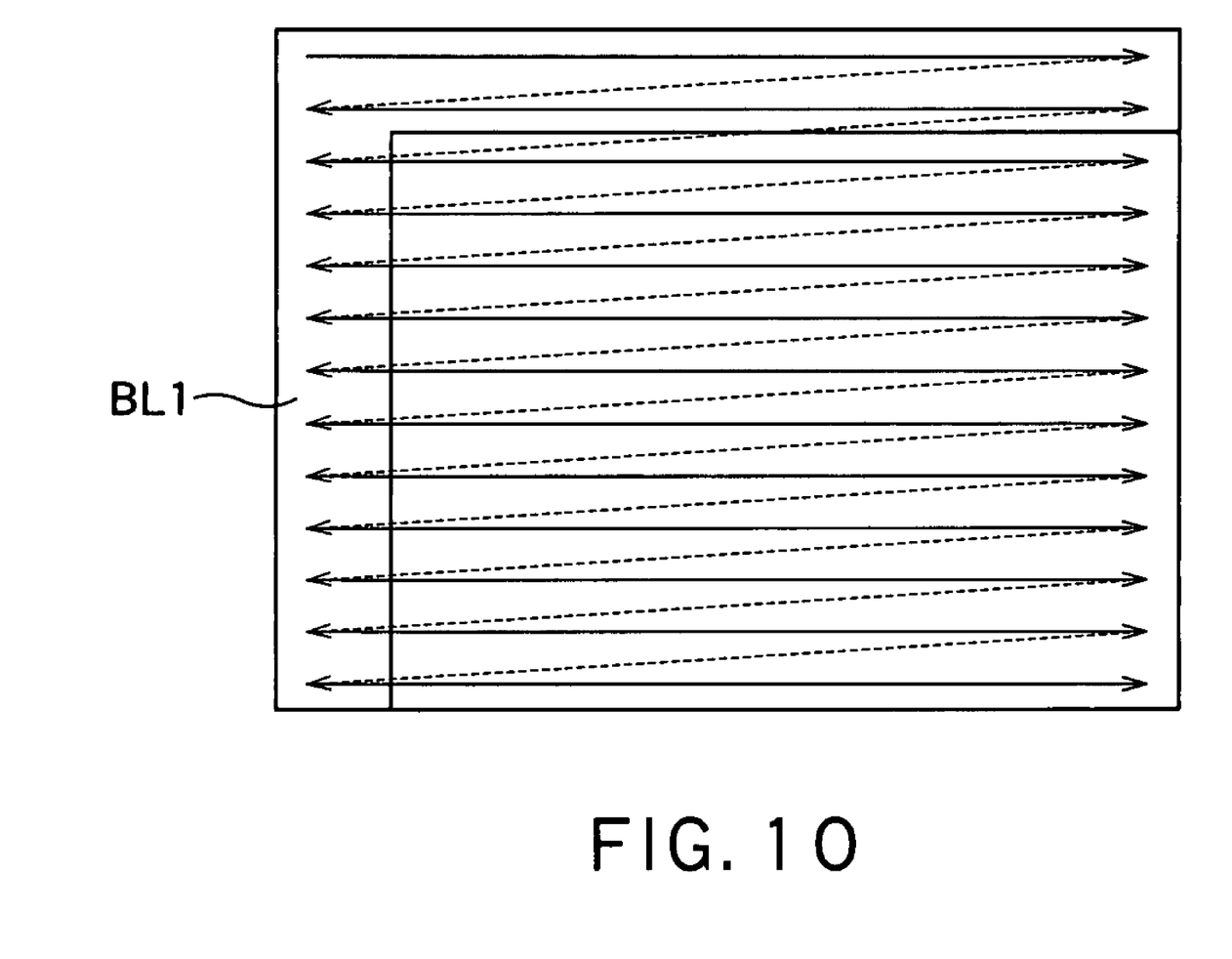
FIG. 10 is a diagram showing how pixel value information in a video frame is sent from a top left corner to a bottom right corner in coordinates.

A configuration of a first embodiment according to the present invention is shown in FIG. 1. This is a video processing apparatus which temporarily writes an input video signal into a frame buffer on a RAM 11, reads it, and generates and outputs a video image. A double buffer (first and second storage means) is formed on the RAM 11. The video signal is represented in a predetermined digital signal. Pixel value information in a video frame is sent from the top left to the bottom right in coordinates, with a pixel clock together, as shown in FIG. 10. Each blank portion BL1 is filled with a dummy pixel value.

First, an analyzer 12 analyzes the input video signal, and finds coordinates of the current pixel value information on the video frame. On the basis of the coordinates, a downscaler 13 performs downscaling processing on the video frame. For example, the downscaler performs ½ scaling by deleting one pixel at intervals of one pixel in each of the vertical and horizontal directions. Thereupon, a writer 14 sends a frame buffer writing request to an arbitrator 15. On the other hand, a reader 16 sends a reading request to the arbitrator 15. On the basis of pixel value information read out, a generator 17 suitably adds a blank and a synchronization signal, and generates and outputs a video signal. The arbitrator 15 arbitrates requests sent from the writer 14 and the reader 16, actually accesses the RAM 11 in a time division form, and performs data transfer. A read buffer decider 18 obtains decision timing on the basis of line information which is being currently processed, sent from the generator 17. On the basis of line information (coordinate in the vertical direction) which is being processed, sent from the analyzer 12 and information of a buffer into which writing is being currently performed in the double buffer, sent from the writer 14, the read buffer decider 18 decides from which buffer to read, and delivers a result thereof to the reader 16. Components shown on the left side of the arbitrator 15 are referred to as input system. Components shown on the right side of the arbitrator 15 are referred to as output system.

Figure 4:
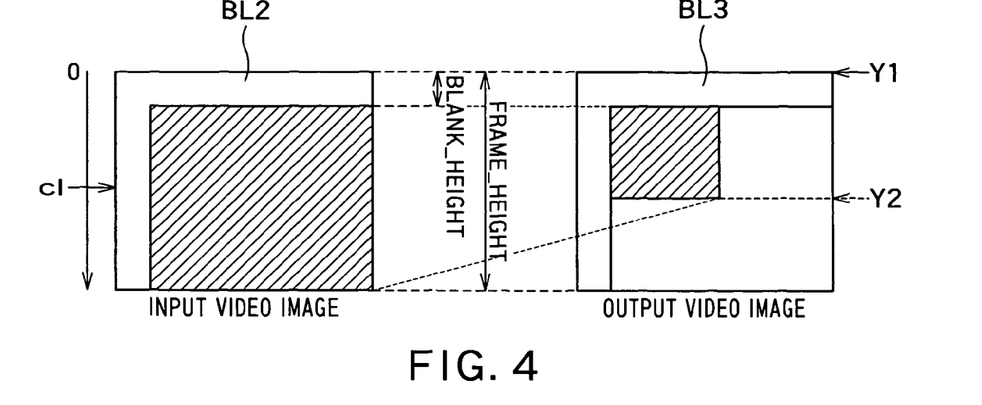
FIG. 4 is a diagram showing states of an input video image and an output image in the first embodiment.

The read buffer decider 18 makes a decision as described below. FIG. 4 shows states of an input video image and an output image. BL2 and BL3 denote blank portions of video images. The input video image is downscaled to ½ as described above, and disposed on a top left portion of the output video image. Line information obtained from the analyzer 12 when the generator 17 is processing a location of line 0 indicated by a solid line arrow Y1 shown in a right-hand drawing of FIG. 4 is denoted by cl. Since downscaling processing is incorporated, the line movement rate on a video image becomes faster on the output side than on the input side. At time when the output system completes reading, i.e., at time when the arrow Y1 in the right-hand drawing moves to a dotted line arrow Y2, the processing proceeds from the current time by BLANK_HEIGHT+(FRAME_HEIGHT−BLANK_HEIGHT)/2. Therefore, a line which is being processed by the input system at that time is presumed to be at cl+BLANK_HEIGHT+(FRAME_HEIGHT−BLANK_HEIGHT)/2. If reading is performed from a buffer into which writing is being performed in the double buffer when the above line {cl+BLANK_HEIGHT+(FRAME_HEIGHT−BLANK_HEIGHT)/2} remains in the current frame, outrunning occurs. At this time, therefore, a buffer different from the buffer into which writing is being performed should be used as the read buffer. Its condition is represented as follows:

$$cl + \text{BLANK\_HEIGHT} + (\text{FRAME\_HEIGHT} - \text{BLANK\_HEIGHT})/2 \leq \text{FRAME\_HEIGHT} \Rightarrow cl \leq (\text{FRAME\_HEIGHT} - \text{BLANK\_HEIGHT})/2$$

It is possible on the reading side to always prevent ruining of video image due to outrunning, by using buffer information the input system is currently writing, the location on the video frame where the input system is currently processing (cl in the case of the present example), and the disposition condition of the output downscaled video image (BLANK_HEIGHT+(FRAME_HEIGHT−BLANK_HEIGHT)/2 in the case of the present example) as heretofore described.

By the way, there may be a plurality of input systems and a plurality of output systems. In the case where a plurality of input video images is arranged on the output video image, for example, the above-described decision is made for each of the input systems.

In the foregoing description, the processing location on the frame is determined by taking a line as a unit. Alternatively, the processing location on the frame may be determined by taking, for example, a pixel instead of a line as the unit.

Second Embodiment

Figure 2:
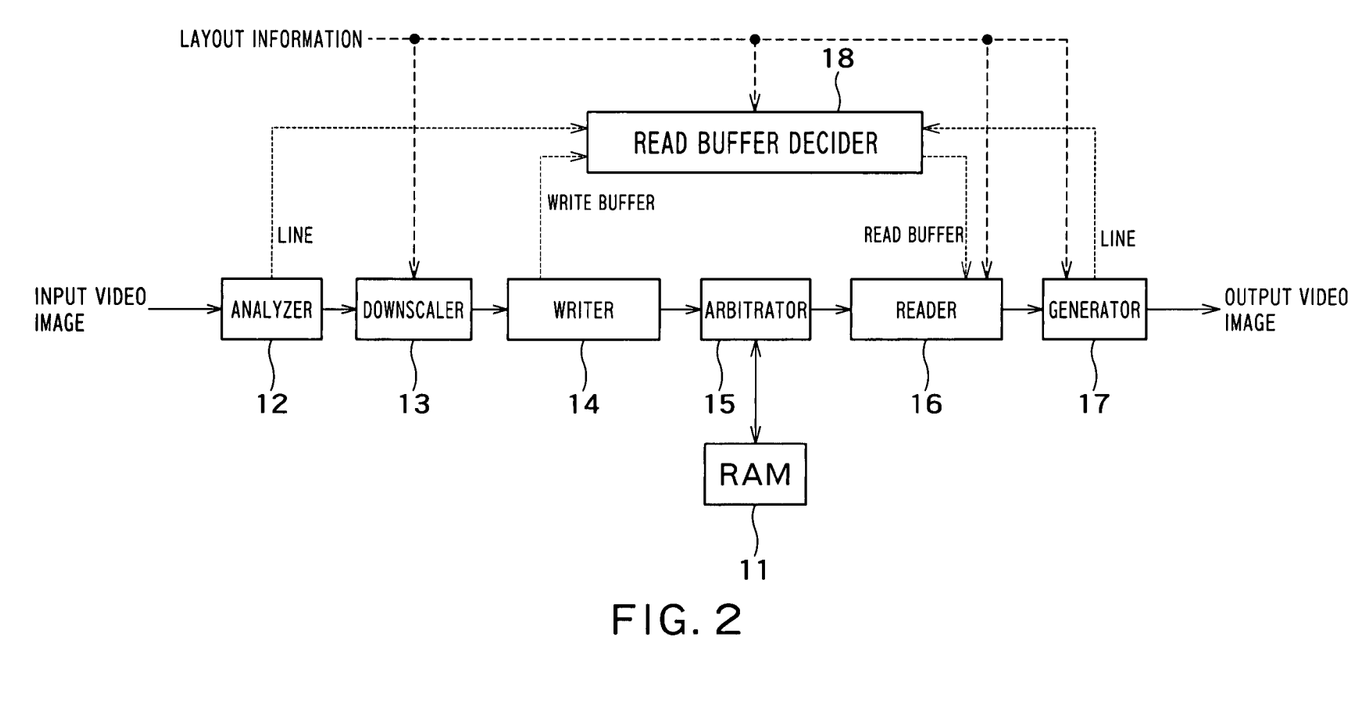
FIG. 2 is a diagram showing a configuration of a second embodiment of the present invention.

A configuration of a video processing apparatus in a second embodiment of the present invention is shown in FIG. 2. In the same way as the first embodiment, the video processing apparatus temporarily writes an input video signal into a frame buffer on a RAM 11, reads the input video signal, and generates and outputs a video image. The second embodiment differs from the first embodiment in that the layout can be changed freely. A reader 16 receives information as to which part of the input video image should be cut. A downscaler 13 receives a downscaling factor to be applied to the part of the input video image. A generator 17 receives where to dispose the downscaled video image. Each of the reader 16, the downscaler 13 and the generator 17 performs processing according to an order of layout information. In addition, in the present embodiment, a read buffer decider 18 also watches the layout information and performs decision processing. Except them, other function units function in the same way as the foregoing description.

Figure 5:
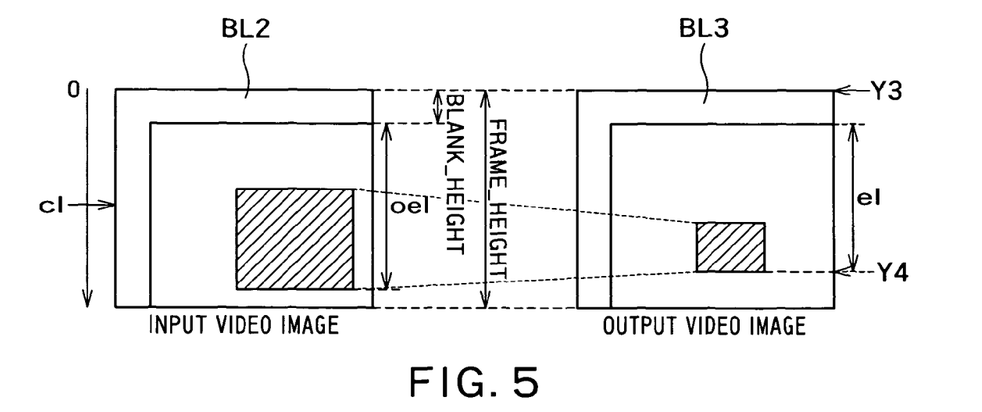
FIG. 5 is a diagram showing states of an input video image and an output image in the second embodiment.

In the same way as FIG. 4, FIG. 5 shows states of an input video image and an output video image. This time, a part of the input video image is cut, downscaled to, for example, ½, and pasted on the output video image. At that time, a coordinate of a bottom end of a cutting range on the input video image is supposed to be oel (in the display region, the same shall apply hereinafter), and a coordinate of a bottom end of a cutting range on the output video image is supposed to be el. The el corresponds to, for example, an end location. The oel corresponds to, for example, a location on the input video frame which is associated with the end location. If the input system is performing processing on a line cl when the output system is performing processing on a line 0 indicated by a solid line arrow Y3 in a right-hand drawing, then the read buffer decider 18 makes a decision as follows.

When oel>el

When the location where the output system is processing arrives at the bottom end of the pasting range as indicated by a dotted line arrow Y4, the location where the input system is processing becomes cl+el+BLANK_HEIGHT. If this location is above the bottom end of the cutting range on the input video image, then outrunning occurs or an immediately preceding frame becomes later (new) one, and consequently reading from it should be performed. Therefore, a condition under which a frame buffer different from a frame buffer into which writing is being currently performed is used as a read buffer is as follows:

$$cl+el+\text{BLANK\_HEIGHT} < oel+\text{BLANK\_HEIGHT} \Rightarrow cl \leq oel-el$$

When oel≦el

As appreciated from the fact that the right side of the preceding expression becomes minus, the condition always becomes false. Instead, when the location where the output system is processing arrives at the bottom end of the pasting range, the input system moves to the next frame buffer in the double buffer and in addition the bottom end of the cutting range is reached in the next frame buffer in some cases. At that time, reading from the next frame buffer should be performed in order to obtain a later video image. Therefore, a condition under which a frame buffer different from a frame buffer into which writing is being currently performed is used as the read buffer is as follows:

$$cl+el+\text{BLANK\_HEIGHT} > oel+\text{BLANK\_HEIGHT}+\text{FRAME\_HEIGHT} \Rightarrow cl > \text{FRAME\_HEIGHT}-(el-oel)$$

Figure 6:
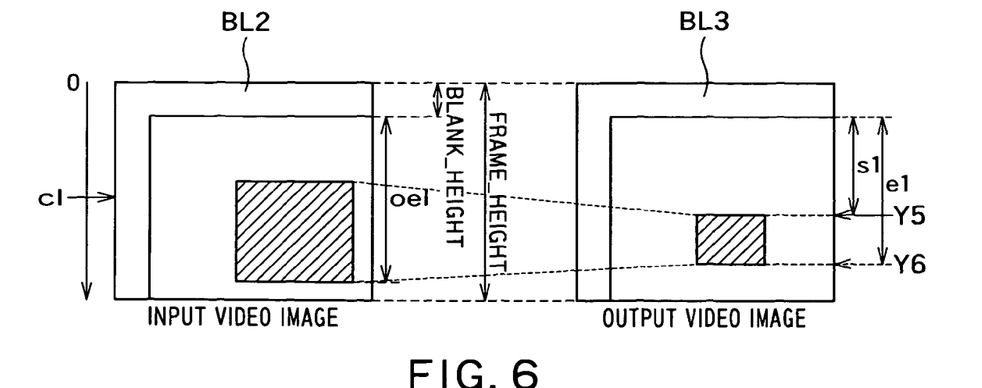
FIG. 6 is a diagram showing the case where a decision is made at a top end of a pasting range on an output video image in the second embodiment.

This is the decision condition. The case where the decision is made at the top end (see a solid line arrow Y5) of the pasting range on the output video image as shown in FIG. 6 will now be considered. The top end of the pasting range on the output video image is denoted by sl. When the location where the output system is processing has moved to a bottom end of the pasting range on the output video image as indicated by a dotted line arrow Y6 in FIG. 6, the location where the input system is processing moves to cl+(el−sl). If it does not exceed the bottom end of the cutting range on the input video image, then a different frame buffer is used as the read buffer in the same way as the foregoing description. In other words, it follows that:

$$cl+(el-sl) < oel+\text{BLANK\_HEIGHT} \Rightarrow cl < oel-el+sl+\text{BLANK\_HEIGHT}$$

If the decision condition is thus set by suitably using the layout information according to decision timing, it is possible to prevent the output video image from being ruined according to the present invention and decrease the delay for the input video image. The decision timing may be at any time as long as it precedes the execution of reading. According to the above expression, sl is set correspondingly.

Figure 7:
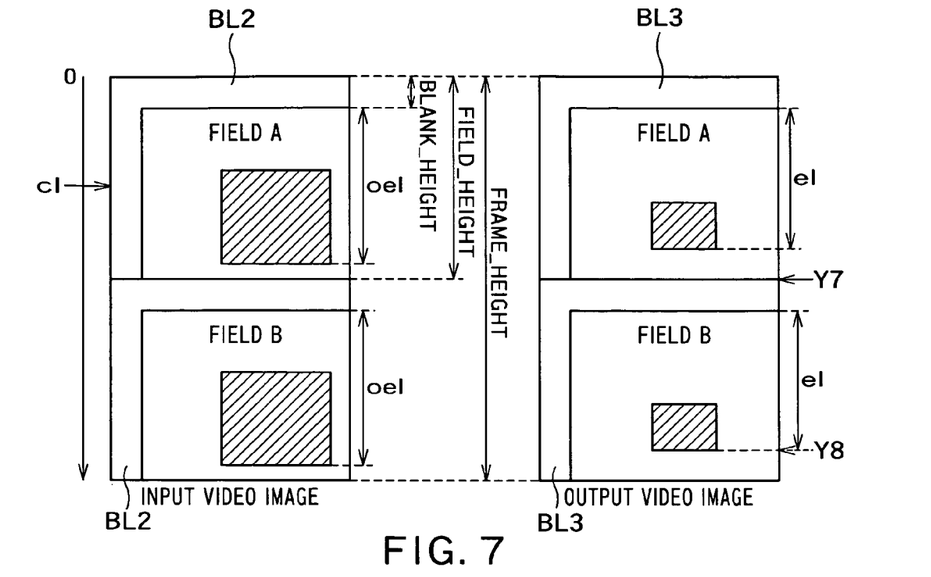
FIG. 7 is a diagram showing states of an input video image and an output video image in the case where one frame includes two fields.

The case where the video signal is an interlaced signal as prescribed in, for example, ITU-R (International Telecommunication Union-Radio communication) BT.656 will now be considered. As for the states of the input video image and the output video image in this case, one frame includes two fields: a field A and a field B as shown in FIG. 7. In this case, a decision is made every field. More details will now be described.

In the case where the output system makes a decision at the head of the frame (line 0, head of the field A) as the foregoing description, a similar result is obtained and consequently its description will be omitted. This time, the case where the output system makes a decision at the head of the field B as indicated by a dotted line arrow Y7 in a right-hand drawing will be considered. The way of thinking is the same. When the location where the output system is processing arrives at an end of the pasting range as indicated by a dotted line arrow Y8, the location where the input system is processing becomes cl+el+BLANK_HEIGHT. If this location is above the end of the cutting range of the field B, then outrunning occurs or an immediately preceding frame becomes later one, and consequently reading from it should be performed. Therefore, a condition under which a frame buffer different from a frame buffer into which writing is being currently performed is used as a read buffer is as follows:

$$cl+el+\text{BLANK\_HEIGHT} < oel+\text{BLANK\_HEIGHT}+\text{FIELD\_HEIGHT} \Rightarrow cl \leq \text{FIELD\_HEIGHT}-(el-oel)$$

If the input video signal and the output video signal are transmitted at definite timing, the interlaced video image may also be used in this way. The decision condition should be suitably set according to it.

Third Embodiment

Figure 3:
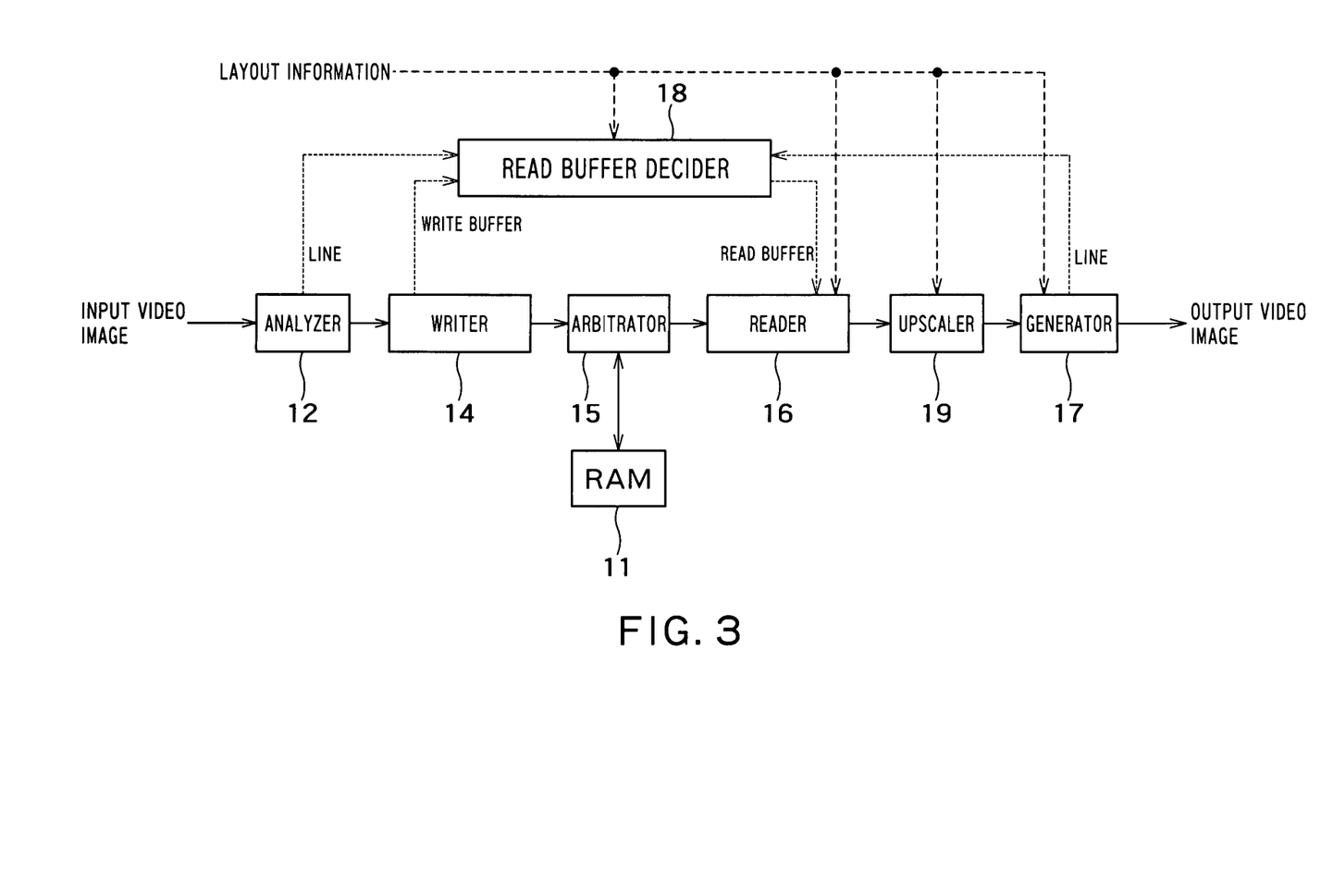
FIG. 3 is a diagram showing a configuration of a third embodiment of the present invention.

A third embodiment of the present invention is shown in FIG. 3. In the present embodiment as well, a video processing apparatus temporarily writes an input video signal into a frame buffer on a RAM 11, reads out the input video signal, and generates and outputs a video image in the same way as the first and second embodiments. The third embodiment differs from the first and second embodiments in that the downscaler preceding the writer 14 is eliminated and instead an upscaler 19 is provided after the reader 16. This time, a part of a cut input video image is upscaled with an ordered upscale factor and pasted on the output video image. It is a point that the moving rate of a location on an input video image which is being processed by the input side becomes faster than the moving rate of a location on an input video image which is being processed by the output side to the contrary to the foregoing description because of the difference between the downscaling and upscaling. Except it, operation is the same as that in the first and second embodiments.

Figure 8:
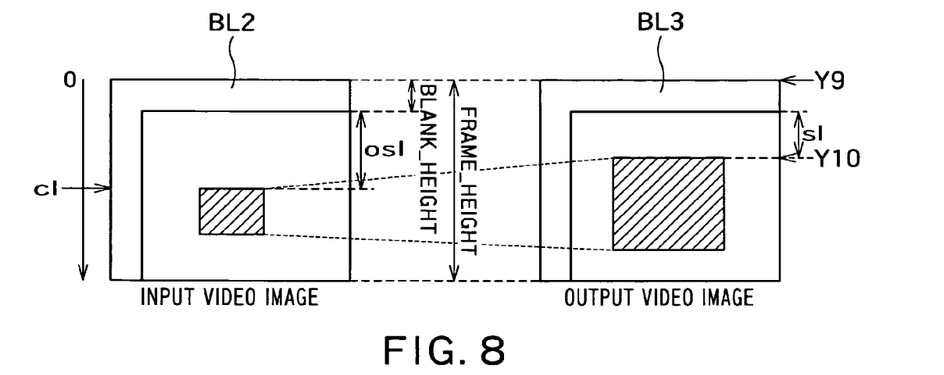
FIG. 8 is a diagram showing states of an input video image and an output image in the third embodiment.

FIG. 8 shows states of the input video image and the output video image in the same way as FIGS. 4 and 5. This time, a part of the input video image is cut as shown in FIG. 8, and it is upscaled to twice and pasted on the output video image. At that time, a coordinate of a top end of a cutting range is denoted by osl and a coordinate of a top end of a pasting range on the output video image is denoted by Sl. The coordinate sl corresponds to, for example, the start location. The coordinate osl corresponds to, for example, a location on the input video frame associated with the start location. If the input system is performing processing on a line cl when the output system is processing a line 0 indicated by a dotted line arrow Y9 in a right-hand drawing, then a read buffer decider 18 makes a decision as follows:

When osl>sl

When the location where the output system is processing arrives at the top end of the pasting range as indicated by a dotted line arrow Y10, the location where the input system is processing becomes cl+sl+BLANK_HEIGHT. If this location is above the bottom end of the cutting range on the input video image, then outrunning occurs or an immediately preceding frame becomes later one, and consequently reading from it should be performed. Therefore, a condition under which a frame buffer different from a frame buffer into which writing is being currently performed is used as a read buffer is as follows:

$$cl+sl+\text{BLANK\_HEIGHT} < osl+\text{BLANK\_HEIGHT} \Rightarrow cl \leq osl-sl$$

When osl≦sl

As appreciated from the fact that the right side of the preceding expression becomes minus, the condition always becomes false. Instead, when the location where the output system is processing arrives at the top end of the pasting range, the input system moves to the next frame buffer and in addition the top end of the cutting range is reached in the next frame buffer in some cases. If reading from the next frame buffer is performed at that time, a later video image is obtained. Therefore, reading from the next frame buffer should be performed. Accordingly, a condition under which a frame buffer different from a frame buffer into which writing is being currently performed is used as the read buffer is as follows:

$$(cl+sl+\text{BLANK\_HEIGHT})-\text{FRAME\_HEIGHT} > osl+\text{BLANK\_HEIGHT} \Rightarrow cl > \text{FRAME\_HEIGHT}+osl-sl$$

Figure 9:
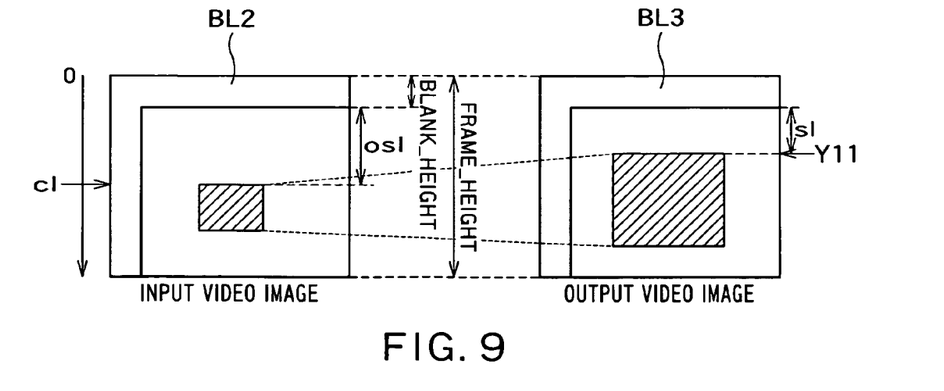
FIG. 9 is a diagram showing the case where a decision is made at a top end of a pasting range on an output video image in the third embodiment.

This is the decision condition. The case where the decision is made at the top end (see a solid line arrow Y11) of the pasting range on the output video image as shown in FIG. 9 will now be considered. If cl does not exceed the top end of the cutting range on the input video image at this time point in this case, then a different frame buffer is used as the read buffer. In other words, it follows that:

$$\Rightarrow cl < osl+\text{BLANK\_HEIGHT}$$

If the decision condition is thus set in the same way even when upscaling is performed, effects of the present invention are obtained in the same way. In the case of interlacing as well, the condition should be set in the same way.

By the way, the downscaler and the upscaler described in the first to third embodiments are nothing but an example. They do not restrict the present invention.

Fourth Embodiment

In the first to third embodiments, the case where the input side performs writing into the frame buffers alternately and the output side decides a buffer to read from has been described. However, the present invention is also effective to the case where the input side decides a buffer to write in when performing writing into a frame buffer and the output side reads alternately from the frame buffers. Hereafter, an example of this case will be described. However, the present invention is not restricted to the example described hereafter, but an embodiment corresponding to the first to third embodiments may also be incorporated.

Figure 11:
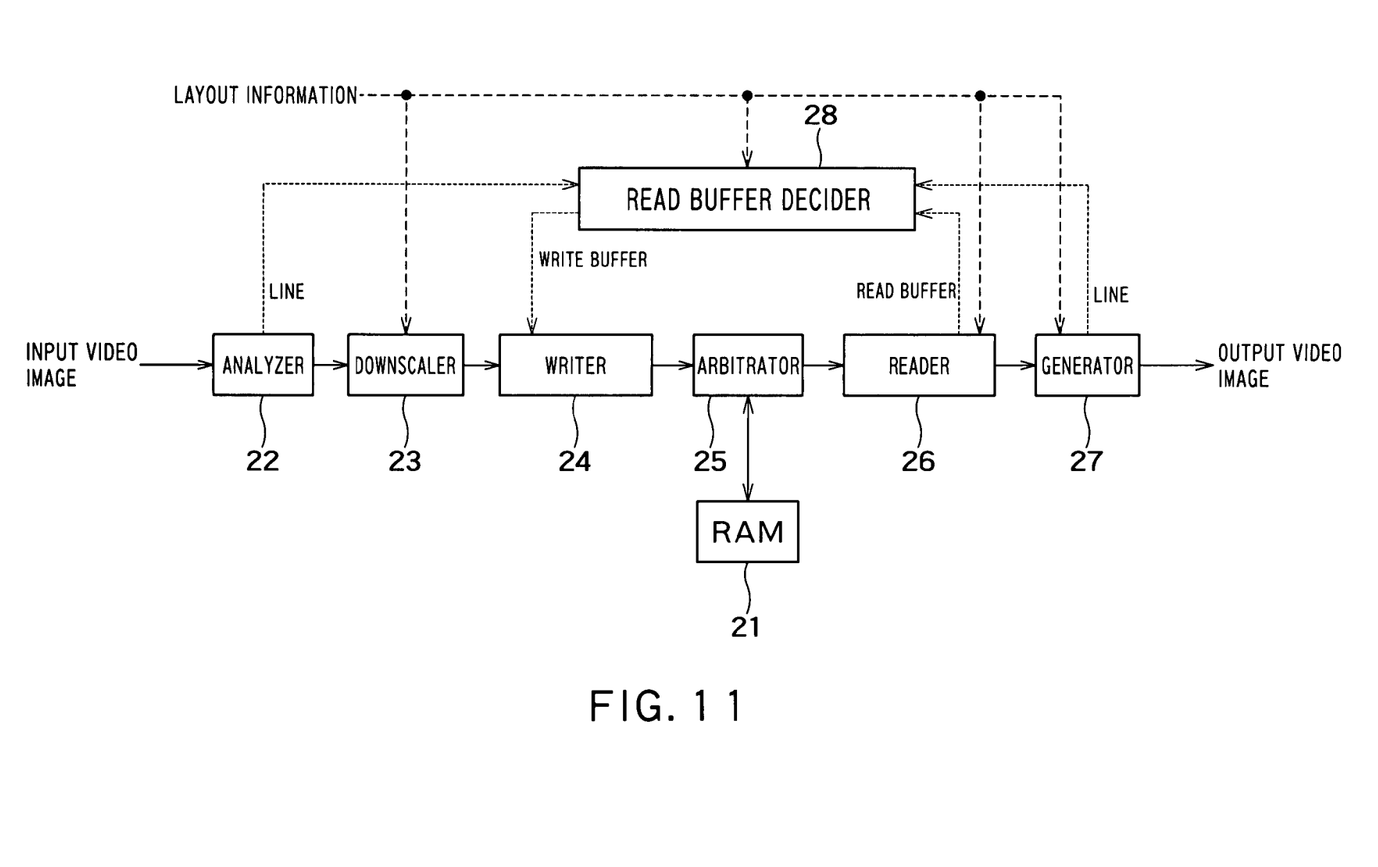
FIG. 11 is a diagram showing a configuration of a fourth embodiment of the present invention.

A configuration of a fourth embodiment according to the present invention is shown in FIG. 11. FIG. 11 differs from FIG. 2 in that the input side decides a buffer to write in when writing into a frame buffer and the output side reads alternately from the frame buffers.

The frame buffers in this embodiment are buffers for output video frame. The reader 16 reads the output video frame from the whole area of one of frame buffers. The writer 16 writes into a part of or whole area of one of frame buffers.

Except this, operation is the same as that in the foregoing description. For the sake of convenience, reference numerals are reassigned to elements. Except the above-described point, operation of each element is the same as that of an element having the like name.

Figure 12:
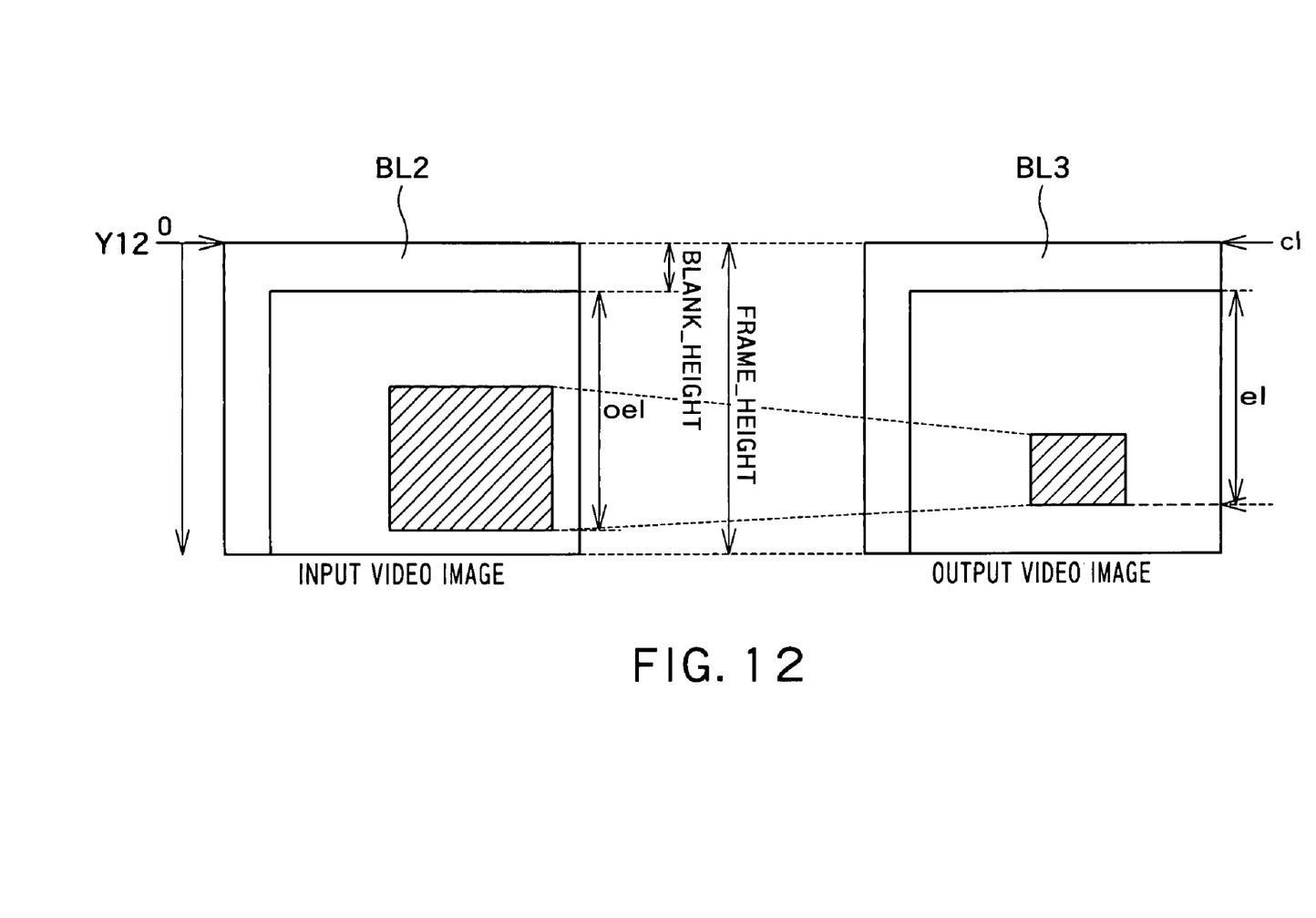
FIG. 12 is a diagram showing states of an input video image and an output image in the fourth embodiment.

FIG. 12 shows states of an input video image and an output video image. FIG. 12 is the same as FIG. 5 except that cl is present on the output side. If the output system is performing processing on a line cl when the input side is performing processing on a line 0 indicated by a solid line arrow Y12 in a left-hand drawing, then a read buffer decider 28 makes a decision as follows.

When oel<el

When the location where the input system is processing arrives at a bottom end of a cutting range, the location where the output system is processing becomes cl+oel+BLANK_HEIGHT. If this location is below a bottom end of a pasting range on the output video image, then outrunning on the reader side occurs or the next frame is read earlier, and consequently writing into it should be performed. Therefore, a condition under which a frame buffer different from a frame buffer from which reading is being currently performed is used as a write buffer is as follows:

$$cl+oel+\text{BLANK\_HEIGHT} > el+\text{BLANK\_HEIGHT} \Rightarrow cl > el-oel$$

When oel≧el

The preceding expression always becomes true. Instead, when the location where the input system is processing arrives at the bottom end of the cutting range, the output system moves to the next frame buffer and in addition the bottom end of the pasting range is reached in that frame buffer in some cases. At that time, writing into the current buffer which is a buffer subsequent to the next buffer should be performed in order to cause the output side to read a later video image. Except this case, therefore, a condition under which a frame buffer different from a frame buffer into which writing is being currently performed is used as the write buffer becomes as follows:

$$cl+oel+\text{BLANK\_HEIGHT} < el+\text{BLANK\_HEIGHT}+\text{FRAME\_HEIGHT} \Rightarrow cl < \text{FRAME\_HEIGHT}-(oel-el)$$

As described above, in this embodiment, the read buffer decider 28 makes an opposite decision of the second embodiment.

In the third embodiment, in which an upscaling situation that a shift of a writing position of the writer 14 is faster than a shift of a reading position of the reader 16 is described, the read buffer decider 28 makes an opposite decision of the second embodiment, too. That is, the write buffer is set as the buffer from which the reader 16 reads then if the reading position of the reader 16 at time when the writer 14 writes into the write start location exceeds the write end location.

In the fourth embodiment heretofore described, the decision is made at the head (cl in FIG. 12) of the output frame. Alternatively, the decision may be made at another location (time point) in the same way as the second and third embodiments described above.

As an example of the first to fourth embodiments heretofore described, the case where the upscaling or downscaling processing is performed has been mentioned. However, the present invention is not restricted to this. It is essence that the writer side is different from the reader side in movement rate on the frame buffer. Therefore, the present invention may be applied to the case where simply the rate of the input video image is different from the rate of the output video image. In that case as well, a similar decision is made according to the present invention.

Each of the elements in the configurations shown in FIGS. 1, 2, 3 and 11 may represent a function obtained by causing a computer to execute a program generated using an ordinary programming technique, may represent hardware, or may represent a combination of them.

According to the embodiments of the present invention, it becomes possible to always make the buffer selecting decision suitably in double buffering even when the input video image and the output video image are asynchronous and in addition the cutting location of the input video image and the pasting location on the output video image are arbitrary, as heretofore described. As a result, it becomes possible to prevent the input image from being ruined and reduce the delay of the output video image from the input video image.

What is claimed is:

1. A video processing apparatus comprising:
video storage including first and second storage regions;
a writer configured to write first video signals representing input video frames alternately into the first and second storage regions;
a reader configured to read out the first video signals from either the first storage region or the second storage region;
a generator configured to generate second video signals representing an output video frame including a video image represented by the read-out first video signals;
a write region acquirer configured to acquire write region information indicating either the first storage region or the second storage region into which the writer is performing writing, before the reader performs reading;
a write location acquirer configured to acquire write location information indicating a location in the first or second storage region, associated with a first video signal the writer is writing, before the reader performs reading; and
a region decider configured to decide either the first storage region or the second storage region from which the reader should perform reading, by using the write region information and the write location information, wherein
a shift of a writing location of the writer is faster than a shift of a reading location of the reader,
the writer writes the first video signals into a range from a write start location to a write end location in the first or second storage region,
the reader reads the first video signals from a range from a read start location to a read end location in the first or second storage region, and
the region decider determines the one of the first storage region and the second storage region indicated by the write region information as a reading region if the write location of the writer at a time when the reader reads out from the read start location is on the read end location side of the read start location, and the region decider determines the other of the first storage region and the second storage region as the reading region if not, the reading region being where the reader reads.

2. A video processing apparatus comprising:
video storage including first and second storage regions;
a writer configured to write first video signals representing input video frames alternately into the first and second storage regions;
a reader configured to read out the first video signals from either the first storage region or the second storage region;
a generator configured to generate second video signals representing an output video frame including a video image represented by the read-out first video signals;
a write region acquirer configured to acquire write region information indicating either the first storage region or the second storage region into which the writer is performing writing, before the reader performs reading;
a write location acquirer configured to acquire write location information indicating a location in the first or second storage region, associated with a first video signal the writer is writing, before the reader performs reading;
a region decider configured to decide either the first storage region or the second storage region from which the reader should perform reading, by using the write region information and the write location information;
a write location estimator configured to estimate an estimated write location based on a read end location and the write location information acquired at a time when the region decider decides, the estimated write location indicating a location where the writer is writing at a time when the reader reads at the read end location; and
a write region estimator configured to estimate an estimated write region based on a read end location, write region information acquired at the time when the region decider decides, and the write location information acquired at the time when the region decider decides, the estimated write region indicating a region where the writer is writing at a time when the reader reads at the read end location; and wherein
a shift of a writing location of the writer is slower than a shift of a reading location of the reader,
the writer writes the first video signals into a range from a write start location to a write end location in the first or second storage region,
the reader reads the first video signals from a range from a read start location to a read end location in the first or second storage region, and
the region decider determines the one of the first storage region and the second region not indicated by the estimated write region as a reading region if the estimated write location is on the read end location side of the read start location, and the region decider determines the other of the first storage region and the second storage region as the reading region if not, the reading region being where the reader reads.

3. The apparatus according to claim 2, wherein the write location estimator estimates an elapsed time from the time when the region decider decides to the time when the reader reads at the read end location, based on a shift speed of a reading location of the reader and a difference between the read end location and a reading location where the reader reads at the time when the region decider decides, and estimates the estimated write location based on the elapsed time, the write location information, and a shift speed of a writing location of the writer, and
the write region estimator assumes the one of the first storage region and the second storage region not indicated by the write region information as the estimated write region if the estimated write location exceeds the write end location, and assumes the other of the first storage region and the second region as the estimated write region if not.

4. A video processing apparatus comprising:
video storage including first and second storage regions;
a writer configured to write first video signals representing input video frames into either the first storage region or the second storage region;
a reader configured to read out the first video signals alternately from the first storage region and the second storage region every output video frame;
a generator configured to generate second video signals representing an output video frame including a video image represented by the read-out first video signals;
a read source acquirer configured to acquire read source information indicating either the first storage region or the second storage region from which the reader is performing reading, before the writer performs writing;
a read location acquirer configured to acquire read location information indicating a location in the first or second storage region, associated with the first video signal the reader is reading, before the writer performs writing; and
a region decider configured to decide either the first storage region or the second storage region into which the writer should write, by using the read source information and the read location information, wherein
a shift of a writing location of the writer is faster than a shift of a reading location of the reader,
the writer writes the first video signals into a range from a write start location to a write end location in the first or second storage region,
the reader reads the first video signals from a range from a read start location to a read end location in the first or second storage region, and
the region decider determines the one of the first storage region and the second storage region not indicated by the read region information as a writing region if the read location of the reader at time when the writer writes into the write start location is on the write end location side of the write start location, and the region decider determines the other of the first storage region and the second storage region as the writing region if not, the writing region being where the writer writes.

5. A video processing apparatus comprising:
video storage including first and second storage regions;
a writer configured to write first video signals representing input video frames into either the first storage region or the second storage region;
a reader configured to read out the first video signals alternately from the first storage region and the second storage region every output video frame;
a generator configured to generate second video signals representing an output video frame including a video image represented by the read-out first video signals;
a read source acquirer configured to acquire read source information indicating either the first storage region or the second storage region from which the reader is performing reading, before the writer performs writing;
a read location acquirer configured to acquire read location information indicating a location in the first or second storage region, associated with the first video signal the reader is reading, before the writer performs writing; and
a region decider configured to decide either the first storage region or the second storage region into which the writer should write, by using the read source information and the read location information;

a read location estimator configured to estimate an estimated read location based on a write end location and the read location information acquired at a time when the region decider decides, the estimated read location indicating a location where the reader is reading at a time when the writer writes into the write end location; and
a read region estimator configured to estimate an estimated read region based on a write end location, read region information acquired at the time when the region decider decides, and the write location information acquired at the time when the region decider decides, the estimated read region indicating a region where the reader is reading at a time when the writer writes into the write end location; and wherein
a shift of a writing location of the writer is slower than a shift of a reading location of the reader,
the writer writes the first video signals into a range from a write start location to a write end location in the first or second storage region,
the reader reads the first video signals from a range from a read start location to a read end location in the first or second storage region, and
the region decider determines the one of the first region and the second storage region indicated by the estimated read region as a writing region if the estimated read location is on the write start location side of the write end location, and the region decider determines the other of the first storage region and the second storage region as the writing region if not, the writing region being where the writer writes.

6. The apparatus according to claim 5, wherein
the read location estimator estimates an elapsed time from the time when the region decider decides to the time when the writer writes into the write end location, based on a shift speed of a writing location of the writer and a difference between the write end location and a writing location where the writer writes at the time when the region decider decides, and estimates the estimated read location based on the elapsed time, the read location information, and a shift speed of a reading location of the reader, and
the read region estimator assumes the one of the first storage region and the second storage region not indicated by the read region information as the estimated read region if the estimated read location exceeds the read end location, and assumes the other of the first storage region and the second storage region as the estimated read region if not.

7. A non-transitory computer readable medium storing a program which, when executed by a computer, causes the computer to perform steps comprising:
writing first video signals representing input video frames alternately into first and second storage regions;
reading out the first video signals from either the first storage region or the second storage region;
generating second video signals representing an output video frame including a video image represented by the read-out first video signals;
acquiring write region information indicating either the first storage region or the second storage region into which writing is being performed, before reading is performed;
acquiring write location information indicating a location in the first or second storage region, associated with a first video signal which is being written, before reading is performed; and deciding either the first storage region or the second storage region from which reading should be performed, by using the write region information and the write location information, wherein a shift of a writing location of the writing is faster than a shift of a reading location of the reading, the writing writes the first video signals into a range from a write start location to a write end location in the first or second storage region, the reading reads the first video signals from a range from a read start location to a read end location in the first or second storage region, and the deciding determines the one of the first storage region and the second storage region indicated by the write region information as a reading region if the write location of the writing at a time when the reading reads out from the read start location is on the read end location side of the read start location, and the deciding determines the other of the first storage region and the second storage region as the reading region if not, the reading region being where the reading reads.

8. A video processing method comprising:

writing first video signals representing input video frames alternately into first and second storage regions;

reading out the first video signals from either the first storage region or the second storage region;

generating second video signals representing an output video frame including a video image represented by the read-out first video signals;

acquiring write region information indicating either the first storage region or the second storage region into which writing is being performed, before reading is performed;

acquiring write location information indicating a location in the first or second storage region, associated with a first video signal which is being written, before reading is performed; and deciding either the first storage region or the second storage region from which reading should be performed, by using the write region information and the write location information, wherein a shift of a writing location of the writing is faster than a shift of a reading location of the reading, the writing writes the first video signals into a range from a write start location to a write end location in the first or second storage region, the reading reads the first video signals from a range from a read start location to a read end location in the first or second storage region, and the deciding determines the one of the first storage region and the second storage region indicated by the write region information as a reading region if the write location of the writing at a time when the reading reads out from the read start location is on the read end location side of the read start location, and the deciding determines the other of the first storage region and the second storage region as the reading region if not, the reading region being where the reading reads.

9. A non-transitory computer readable medium storing a program which, when executed by a computer, causes the computer to perform steps comprising:

writing first video signals representing input video frames alternately into first and second storage regions;

reading out the first video signals from either the first storage region or the second storage region;

generating second video signals representing an output video frame including a video image represented by the read-out first video signals;

acquiring write region information indicating either the first storage region or the second storage region into which writing is being performed, before reading is performed;

acquiring write location information indicating a location in the first or second storage region, associated with a first video signal which is being written, before reading is performed;

deciding either the first storage region or the second storage region from which reading should be performed, by using the write region information and the write location information;

estimating an estimated write location based on a read end location and the write location information acquired at a time of the deciding, the estimated write location indicating a location where the writing is writing at a time when the reading reads at the read end location; and estimating an estimated write region based on a read end location, write region information acquired at the time of the deciding, and the write location information acquired at the time of the deciding, the estimated write region indicating a region where the writing is writing at a time when the reading reads at the read end location; and wherein shift of a writing location of the writing is slower than a shift of a reading location of the reading, the writing writes the first video signals into a range from a write start location to a write end location in the first or second storage region, the reading reads the first video signals from a range from a read start location to a read end location in the first or second storage region, and the deciding determines the one of the first storage region and the second storage region not indicated by the estimated write region as a reading region if the estimated write location is on the read end location side of the read start location, and the deciding determines the other of the first storage region and the second storage region as the reading region if not, the reading region being where the reader reads.

10. A video processing method comprising:

writing first video signals representing input video frames alternately into first and second storage regions;

reading out the first video signals from either the first storage region or the second storage region;

generating second video signals representing an output video frame including a video image represented by the read-out first video signals;

acquiring write region information indicating either the first storage region or the second storage region into which writing is being performed, before reading is performed;

acquiring write location information indicating a location in the first or second storage region, associated with a first video signal which is being written, before reading is performed; and deciding either the first storage region or the second storage region from which reading should be performed, by using the write region information and the write location information;

estimating an estimated write location based on a read end location and the write location information acquired at time of the deciding, the estimated write location indicating a location where the writing is writing at a time when the reading reads at the read end location; and estimating an estimated write region based on a read end location, write region information acquired at a time of the deciding, and the write location information acquired at the time of the deciding, the estimated write region indicating a region where the writing is writing at a time when the reading reads at the read end location; and wherein a shift of a writing location of the writing is slower than a shift of a reading location of the reading, the writing writes the first video signals into a range from a write start location to a write end location in the first or second storage region, the reading reads the first video signals from a range from a read start location to a read end location in the first or second storage region, and the deciding determines the one of the first storage region and the second region not indicated by the estimated write region as a reading region if the estimated write location is on the read end location side of the read start location, and the deciding determines the other of the first storage region and the second storage region as the reading region if not, the reading region being where the reader reads.

* * * * *